Oct. 23, 1928.
J. F. RUDE
1,689,053
HARROW
Filed Oct. 7, 1926
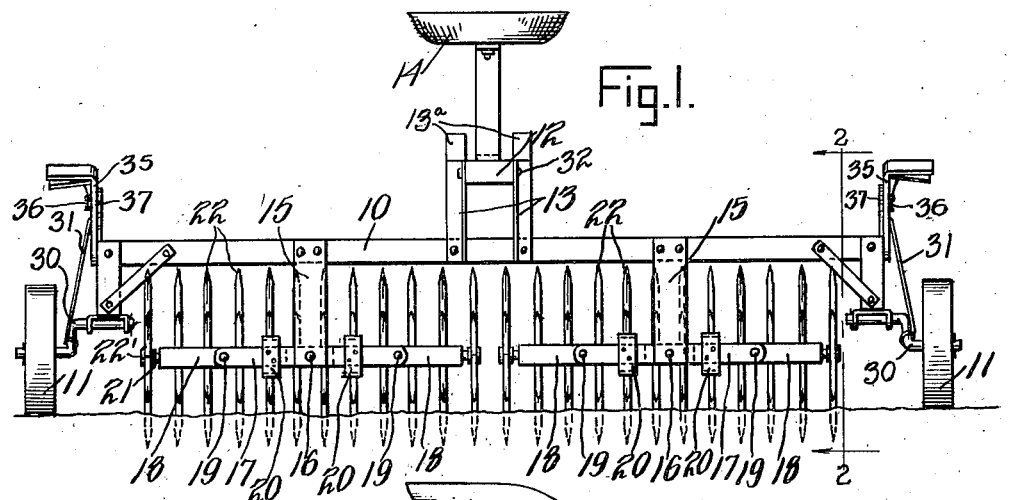
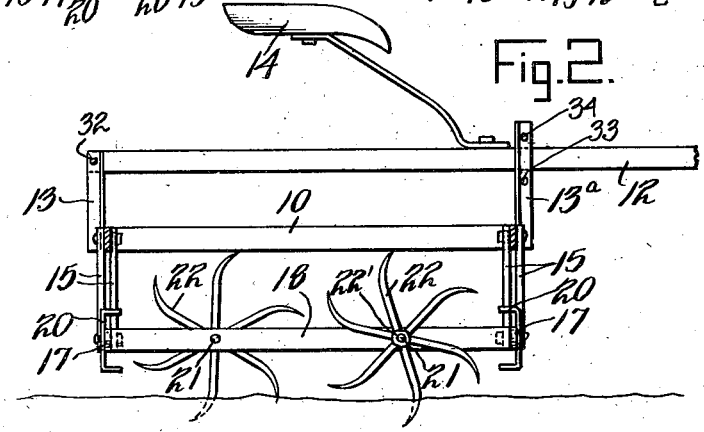
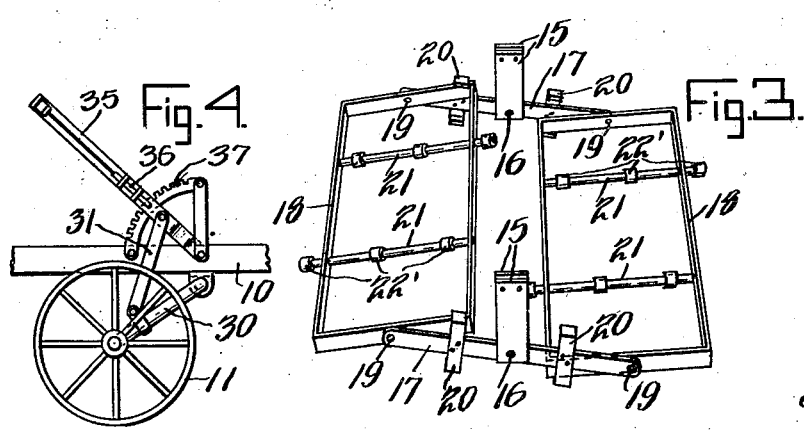
Inventor
John F. Rude
By
*C W Bradford*
Attorney Patented Oct. 23, 1928.

1,689,053

UNITED STATES PATENT OFFICE.

JOHN F. RUDE, OF LIBERTY, INDIANA.

HARROW.

Application filed October 7, 1926. Serial No. 140,065.

My invention relates to harrows, or ground treating devices, and more particularly to a structure comprising a rigid main frame and a series of pivoted or floating frames or units carrying the harrowing means, the object being to provide a structure that in operation will conform to any uneven surfaces of the ground and reach the low portions without digging too deeply into the high ones, all as will be hereinafter more fully described and claimed.

Referring to the accompanying drawings which form a part hereof and on which like numerals designate similar parts in the several views;

Figure 1 is a rear elevation of a harrow of my improved type,

Figure 2, a section on the line 2—2 in Figure 1,

Figure 3, a perspective view showing the frame of one unit, and

Figure 4, a detail view.

In said drawings the numeral 10 denotes a rigid frame carried by wheels 11 which are adjustable by means of off-set axles 30 and connecting rods 31, operated by levers 35 (held in adjusted position by pawls 36 engaging teeth in segments 37 in the well known manner) to raise or lower the frame in relation to the ground. A draft tongue 12 is mounted on a pivot 32 between standards 13 secured to the rear bar of frame 10 and is adapted to vibrate on said pivot, being limited in its movement by pins 33 and 34 in standards 13ª which are secured to the front bar of said frame. A driver's seat 14 is preferably mounted on said tongue. By this means the frame 10 is adapted to tilt somewhat to conform to the ground surface irregularities, as will be readily understood.

Depending from the front and rear members or frame bars of the frame 10 are hangers 15 having end bars or equalizer bars 17 pivoted at 16 to their lower ends. Said pivoted bars extend an equal distance on each side of the pivot 16. Rectangular or auxiliary, or floating frames 18 are pivoted as at 19 near the ends of the bars 17 and are limited in their rocking movement by means of clips or brackets 20 with overhanging lips bolted to the bars 17. The frames 18 carry shafts 21 upon which are mounted either tooth wheels 22, as shown, or any other well known ground treating devices such as disks, shovels, pulverizer disks, grain drills or the like. In order to equalize the strain on the frames 18, I have shown each frame as carrying two shafts 21, each having three wheels thereon with one wheel of each shaft outside of the frame and two inside with the outside wheels at the opposite ends of their respective shafts as shown by the hubs 22' in Figure 3. This structure permits each outside wheel 22 to have ample clearance during the rocking movement of the frames 18.

I have illustrated in Figure 1 an implement provided with two harrowing units, however, I do not wish to be limited to this number as the frame 10 can be constructed to accommodate any number of units, or but a single unit, without departing from the spirit of my invention and I do not, therefore, limit myself to what is shown in the drawings or described in the specification but only as indicated in the appended claims.

It will be understood, of course, that the term "harrow" as used in the specification and claims signifies any instrumentality for treating the surface of the ground such as by plowing, pulverizing, drilling, etc. and that my invention is not confined to any particular type of instrumentality.

Having thus fully described my said invention, what I claim as new and desire to secure by Letters Patent, is:

1. A harrow comprising a main frame, adjustable supporting wheels for said frame, a series of pairs of hangers depending from said frame, a bar pivoted between each pair of hangers, frames pivoted to the ends of said bars, ground treating devices carried by said frames, and means for limiting the movement of said frames carried by said bars, substantially as set forth.

2. A harrow comprising a main frame, adjustable supporting wheels for said frame, a series of aligned pairs of hangers depending from said frame, a bar pivoted between each pair of hangers, frames pivoted to the ends of said bars, ground treating devices rotatable on shafts carried by said frames with the devices of one shaft in staggered relation to the devices of the other shaft, substantially as set forth.

3. A harrow comprising a main frame, a plurality of hangers depending from said frame, a bar pivoted between a pair of said hangers, auxiliary frames pivoted to said bar, and ground treating devices carried by said auxiliary frames, substantially as set forth.

4. A harrow comprising a main frame, a plurality of hangers depending from said frame, a bar pivoted between a pair of said hangers, auxiliary frames pivoted on said bar, shafts carried by said auxiliary frames, staggered rotatably mounted ground treating devices on said shafts, and adjustable means for gaging the depth of said ground treating devices, substantially as set forth.

5. A harrow comprising a main frame, a hanger depending from said main frame, a bar pivotally connected to said hanger, auxiliary frames pivoted on said bar, shafts carried by said auxiliary frames, staggered rotatably mounted ground treating devices on said shafts, and adjustable means for gaging the elevation of the shafts to cause the ground treating devices, to engage the earth at different depths substantially as set forth.

6. A harrow comprising a main frame having front and rear frame bars, equalizer bars pivoted to the front and rear frame bars, and an auxiliary frame pivoted to the opposed ends of said equalizer bars said equalizer bars and auxiliary frame bars being pivoted transversely of the path of movement of the harrow, substantially as set forth.

7. A harrow comprising a main frame having front and rear frame bars, depending hangers fixed to the front and rear frame bars, equalizer bars pivotally supported by said hangers, auxiliary frames pivoted to said equalizer bars between the corresponding ends of the same, and ground treating devices carried by said auxiliary frames, substantially as set forth.

8. A device of the class described comprising a main frame, hangers depending from said main frame, a bar pivotally supported by each of said hangers, auxiliary frames pivotally supported by the ends of each pair of bars and ground treating devices carried by said auxiliary frames, substantially as set forth.

9. A cultivator comprising a main frame, spaced bars connected to the main frame in a manner to pivot transversely of the path of movement of the vehicle, and one or more auxiliary frames mounted between said spaced bars also in a manner to pivot transversely of the path of movement of the vehicle, whereby the auxiliary frame may be raised or lowered as a unit and may pivot in either position to accommodate itself to the ground surface operated upon, and ground treating devices carried by said auxiliary frame, substantially as set forth.

10. A cultivator comprising a main frame, means at the ends of the main frame for supporting the same and for determining its height above the ground, one or more auxiliary frames beneath the main frame connected to the main frame in a manner to permit it to be raised or lowered as a unit and pivot when in any position, whereby said auxiliary frame may accommodate itself to the ground surface operated upon, and ground treating devices carried by each auxiliary frame and adapted to project below said supporting means and bear the weight of the device and be forced into the ground until said supporting means assists in the supporting action, substantially as set forth.

11. A cultivator comprising a main frame, means for supporting the main frame and for determining its height above the ground, one or more auxiliary frames beneath the main frame connected to the main frame in a manner to permit it to be raised or lowered as a unit and pivot when in any position, whereby said auxiliary frame may accommodate itself to the ground surface operated upon, and ground treating devices carried by each auxiliary frame and adapted to project below said supporting means and bear the weight of the device and be forced into the ground until said supporting means assists in the supporting action, substantially as set forth.

In witness whereof, I have hereunto set my hand at Indianapolis, Indiana, this 4th day of October, A. D., 1926.

JOHN F. RUDE.